(12) United States Patent
Boylan

(10) Patent No.: US 8,906,522 B2
(45) Date of Patent: Dec. 9, 2014

(54) HARD NON-OXIDE OR OXIDE CERAMIC / HARD NON-OXIDE OR OXIDE CERAMIC COMPOSITE HYBRID ARTICLE

(75) Inventor: Joseph Boylan, St. Marys, PA (US)

(73) Assignee: Morgan Advanced Materials and Technology Inc., St. Marys, PA (US)

( * ) Notice: Subject to any disclaimer, the term of this patent is extended or adjusted under 35 U.S.C. 154(b) by 1044 days.

(21) Appl. No.: 12/831,616

(22) Filed: Jul. 7, 2010

(65) Prior Publication Data

US 2011/0008604 A1 Jan. 13, 2011

Related U.S. Application Data

(60) Provisional application No. 61/223,629, filed on Jul. 7, 2009, provisional application No. 61/328,262, filed on Apr. 27, 2010.

(51) Int. Cl.
*B32B 15/04* (2006.01)
*F16C 33/14* (2006.01)
(Continued)

(52) U.S. Cl.
CPC ......... *C04B 35/565* (2013.01); *C04B 2237/368* (2013.01); *C04B 2235/421* (2013.01);
(Continued)

(58) Field of Classification Search
CPC ........ C04B 33/00; C04B 35/00; C04B 35/01; C04B 35/515; C04B 35/52; C04B 35/56; C04B 35/565; C04B 37/00; C04B 37/001; C04B 2237/00; C04B 2237/30; C04B 2237/32; C04B 2237/34; C04B 2237/36; C04B 2237/365; B32B 9/00; B32B 18/00; B32B 2313/00; B32B 2313/04
USPC ......... 428/688, 689, 698, 699, 701, 702, 704, 428/615, 621, 627
See application file for complete search history.

(56) References Cited

U.S. PATENT DOCUMENTS 3,925,577 A * 12/1975 Fatzer et al. ............. 427/249.16
3,960,577 A * 6/1976 Prochazka ..................... 252/504
(Continued)

FOREIGN PATENT DOCUMENTS

EP 0012966 7/1980
EP 0012966 * 9/1980
(Continued)

OTHER PUBLICATIONS

EP0012966 Description, 1980.*
(Continued)

*Primary Examiner* — David Sample
*Assistant Examiner* — Lauren Colgan
(74) *Attorney, Agent, or Firm* — Kilpatrick Townsend & Stockton LLP; Dean W. Russell, Esq.; Tiffany L. Williams, Esq.

(57) ABSTRACT

Described are hybrid articles comprising at least one hard non-oxide or oxide ceramic component of at least 95% of theoretical density directly bonded to, and different from, a hard non-oxide or oxide ceramic composite component comprising a tribology enhancing component. The at least one hard non-oxide or oxide ceramic component comprises a member of the group consisting of silicon carbide, pressureless sintered silicon carbide, liquid phase sintered silicon carbide, reaction bonded silicon carbide, tungsten carbide, aluminum oxide, and silicon nitride. The at least one hard non-oxide or oxide ceramic composite component comprises a member of the group consisting of silicon carbide, pressureless sintered silicon carbide, liquid phase sintered silicon carbide, reaction bonded silicon carbide, tungsten carbide, aluminum oxide, and silicon nitride.

10 Claims, 10 Drawing Sheets

(51) Int. Cl.
*C04B 35/565* (2006.01)
*F16C 33/04* (2006.01)
*C04B 37/00* (2006.01)
*F16C 33/12* (2006.01)
*C04B 35/628* (2006.01)

(52) U.S. Cl.
CPC ... *C04B 2237/363* (2013.01); *C04B 2235/3821* (2013.01); *F16C 33/14* (2013.01); *C04B 2235/3205* (2013.01); *F16C 33/043* (2013.01); *C04B 2235/422* (2013.01); *C04B 2237/36* (2013.01); *C04B 37/001* (2013.01); *C04B 2237/365* (2013.01); *F16C 33/12* (2013.01); *C04B 2235/425* (2013.01); *C04B 2237/343* (2013.01); *C04B 35/62839* (2013.01); *C04B 2235/402* (2013.01)
USPC ........... 428/699; 428/688; 428/689; 428/704; 428/627; 428/698

(56) References Cited

U.S. PATENT DOCUMENTS

| | | | |
|---|---|---|---|
| 4,023,975 A * | 5/1977 | Prochazka | 501/91 |
| 4,108,929 A * | 8/1978 | Prochazka et al. | 264/29.1 |
| 4,354,991 A * | 10/1982 | Suzuki et al. | 264/674 |
| 4,382,113 A * | 5/1983 | Schwartz et al. | 428/408 |
| 4,690,909 A * | 9/1987 | Okuno et al. | 501/90 |
| 4,692,418 A * | 9/1987 | Boecker et al. | 501/90 |
| 4,701,426 A * | 10/1987 | Okuno et al. | 501/90 |
| 4,829,027 A * | 5/1989 | Cutler et al. | 501/89 |
| 4,858,817 A | 8/1989 | Hwang et al. | |
| 4,876,226 A * | 10/1989 | Fuentes | 501/89 |
| 4,946,808 A * | 8/1990 | Wei et al. | 501/95.3 |
| 5,164,344 A | 11/1992 | Zank | |
| 5,196,389 A | 3/1993 | Dubots | |
| 5,504,046 A | 4/1996 | Kim | |
| 5,580,834 A | 12/1996 | Pfaff | |
| 5,623,386 A | 4/1997 | Sullivan | |
| 5,656,218 A * | 8/1997 | Lin et al. | 501/89 |
| 5,656,563 A * | 8/1997 | Chen et al. | 501/90 |
| 5,707,567 A * | 1/1998 | Pfaff | 264/29.7 |
| 5,850,329 A | 12/1998 | Sullivan | |
| 5,968,653 A * | 10/1999 | Coppella et al. | 428/408 |
| 5,976,429 A * | 11/1999 | Chen et al. | 264/29.6 |
| 5,978,174 A | 11/1999 | Sullivan | |
| 6,245,287 B1 | 6/2001 | Kokubo et al. | |
| 6,555,031 B2 | 4/2003 | Gadkaree et al. | |
| 6,586,886 B1 | 7/2003 | Katz et al. | |
| 6,677,712 B2 | 1/2004 | Katz et al. | |
| 6,716,800 B2 * | 4/2004 | Demendi et al. | 508/107 |
| 6,740,286 B2 | 5/2004 | Sutaria et al. | |
| 6,759,117 B2 | 7/2004 | Bauer et al. | |
| 6,762,140 B2 * | 7/2004 | Pujari et al. | 501/88 |
| 6,887,569 B1 | 5/2005 | Kriven et al. | |
| 6,919,127 B2 * | 7/2005 | Waggoner et al. | 428/325 |
| 6,953,760 B2 * | 10/2005 | Pujari et al. | 501/90 |
| 7,063,812 B2 | 6/2006 | Sutaria et al. | |
| 7,128,963 B2 | 10/2006 | Benitsch | |
| 7,166,550 B2 | 1/2007 | Chen | |
| 7,452,606 B2 * | 11/2008 | Bryden | 428/432 |
| 7,993,571 B2 * | 8/2011 | Bryden | 264/646 |
| 2002/0011683 A1 | 1/2002 | Gadkaree et al. | |
| 2002/0084103 A1 | 7/2002 | Komatsu et al. | |
| 2002/0140139 A1 | 10/2002 | Sutaria et al. | |
| 2003/0111961 A1 | 6/2003 | Katz et al. | |
| 2003/0195122 A1 * | 10/2003 | Demendi et al. | 508/107 |
| 2003/0201723 A1 | 10/2003 | Katz et al. | |
| 2005/0001362 A1 | 1/2005 | Sutaria et al. | |
| 2006/0154800 A1 | 7/2006 | Chen | |
| 2006/0220280 A1 | 10/2006 | Sutaria et al. | |
| 2007/0267820 A1 * | 11/2007 | Martin | 277/404 |
| 2008/0093779 A1 * | 4/2008 | Cutler et al. | 264/682 |
| 2013/0168928 A1 * | 7/2013 | Schrufer et al. | 277/500 |

FOREIGN PATENT DOCUMENTS

| | | |
|---|---|---|
| GB | 1109704 | 4/1968 |
| JP | 61-122164 A | 6/1986 |
| JP | 62-197361 A | 9/1987 |
| JP | 64-087562 A | 3/1989 |
| JP | 03-050154 A | 3/1991 |
| JP | 09-175870 A | 7/1997 |
| JP | 2002-293634 A | 10/2002 |
| JP | 2009-120483 A | 6/2009 |
| WO | WO0198207 | 12/2001 |
| WO | WO03047827 | 6/2003 |
| WO | WO03054913 | 7/2003 |
| WO | WO2011005808 | 1/2011 |

OTHER PUBLICATIONS

Advanced Joining (Advanced joining technology: a report) 1982.*
http://www.yourdictionary.com/wall, 2013.*
Tominaga JP62-197361, human translation.*
International Preliminary Report on Patentability dated Jan. 19, 2012 in related Application No. PCT/US2010/041131.
Paper entitled "New Low-Cost Manufacturing Methods to Produce Silicon Carbide (SiC) for Lightweight Armor Systems," by James Campbell, et al., 07 pages, presented at Proceedings of the 2008 Army Science Conference (2008).
Ceramics Industry, Chapter 2.4 Ceramic Matrix Composites, Title page and pp. 2-14 to 2-25 (1998).
Website entitled Silicon Carbide (SiC) Morgan Advanced Ceramics http://web.archive.org/web/20070814104702/www.morganadvancedceramics.com/material . . . (2007).
Website entitled Silicon Carbide—Reaction Bonded Silicon Carbide (RBSC) http://web.archive.org/web/20051123025235/http://www.azom.com/details.asp?ArticleID . . . (2005).
International Search Report and Written Opinion dated Jan. 27, 2011 in related Serial No. PCT/US2010/041131.
The New Shorter Oxford English Dictionary on Historical Principles, Edited by Lesley Brown, vol. 2 N-Z, p. 3388 (undated).
Japan Patent Application No. 2012-519686, Translated Examination Report dated Feb. 24, 2014, 3 pages.

* cited by examiner

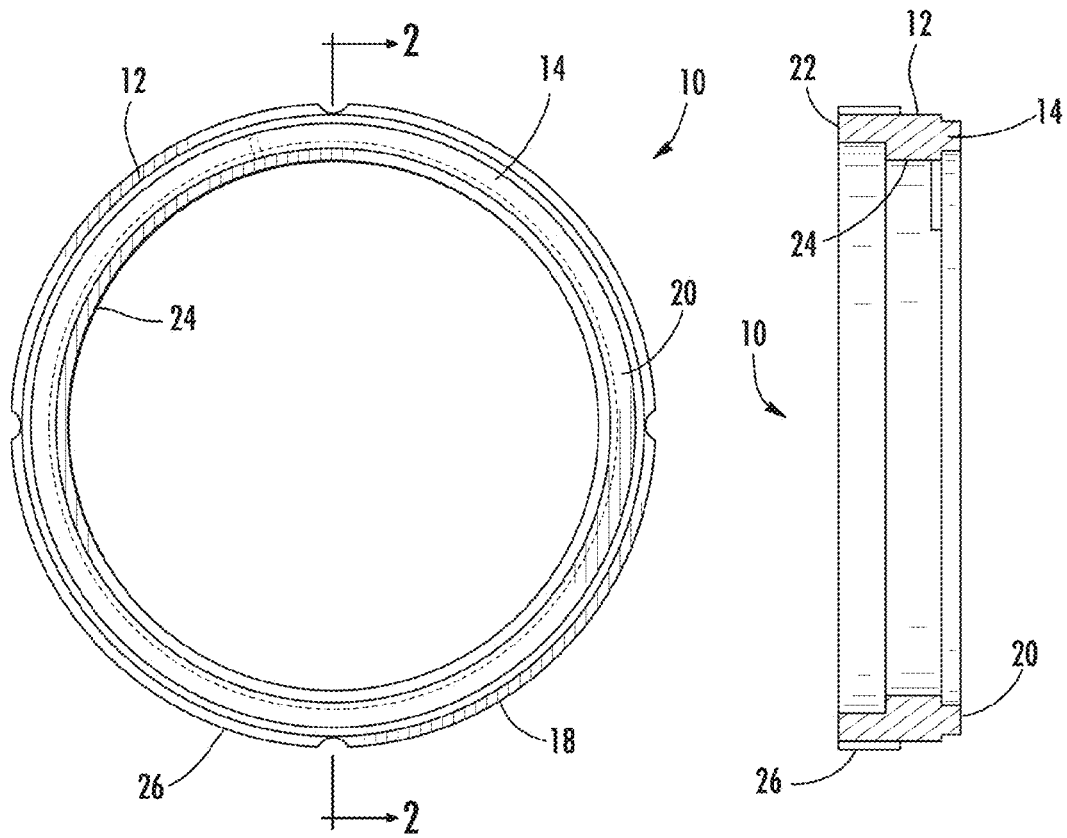

HARD NON-OXIDE OR OXIDE CERAMIC / HARD NON-OXIDE OR OXIDE CERAMIC COMPOSITE HYBRID ARTICLE

CROSS REFERENCE TO RELATED APPLICATIONS

This application is related to and claims priority benefits from U.S. Provisional Application Ser. No. 61/223,629, filed on Jul. 7, 2009, entitled MONOLITHIC/ COMPOSITE SILICON CARBIDE LAYERED ARTICLE, and U.S. Provisional Application Ser. No. 61/328,262, filed on Apr. 27, 2010, entitled HARD NON-OXIDE OR OXIDE CERAMIC/ HARD NON-OXIDE OR OXIDE CERAMIC COMPOSITE HYBRID ARTICLE. The '629 and '262 applications are hereby incorporated in their entirety by this reference.

FIELD OF THE INVENTION

This invention relates to the field of articles formed from components of hard non-oxide or oxide ceramic materials and composites of these same materials.

BACKGROUND

Hard non-oxide or oxide ceramic materials are commonly used in applications requiring materials with a high hardness, superior strength, good corrosion resistance, and high thermal conductivity, such as the materials used in acidic, caustic, corrosive, abrasive, high speed, or high temperature environments. These types of applications include rotating equipment, pump seals and bearings, gas turbine components, mixing nozzles, and flame holders. Examples of these hard non-oxide or oxide ceramic materials include but are not limited to silicon carbide, pressureless sintered silicon carbide, liquid phase sintered silicon carbide, reaction bonded silicon carbide, tungsten carbide, aluminum oxide, and silicon nitride.

A drawback to these hard non-oxide or oxide ceramic materials is the lack of self-lubricity when used alone. A self-lubricating solid is one having low friction in the absence of an adequate lubricant. For example, in applications having a high PV (pressure-sliding velocity) or marginal lubrication conditions, parts, such as seals or bearings, having a hard non-oxide or oxide ceramic material surface adjoining with relative motion against another surface made of the same or other hard non-oxide or oxide ceramic material, other silicon carbide materials, other ceramics, or steel will wear excessively due to the forces generated by the high friction. In marginal lubrication conditions with mating surfaces, special wear surfaces must be provided on at least one of the bodies.

Graphite is a known lubricant and has been incorporated into carbon and silicon carbide materials to impart a self-lubricating property to the material. For example, U.S. Pat. Nos. 5,580,834, 5,656,563, and 5,968,653, the contents of which are incorporated herein by reference, teach the use of a carbon graphite/silicon carbide composite material. Other inclusions, such as tribology enhancing additives, porosity, boron carbide, etc., can also improve the tribology of the material. The composite materials have wear resistance superior to hard non-oxide or oxide ceramic materials, in that the material of the present invention can run against itself or other hard non-oxide or oxide ceramic, non-self-lubricating materials in sliding face applications, such as for mechanical seals and pump bearings, in marginal lubrication conditions. Composite materials also have thermal shock resistance superior to hard non-oxide or oxide ceramic materials. In catastrophic failure or dry run conditions, such as when fluid is lost in pump applications, seals and bearings made of the composite material have enhanced survivability and can maintain their integrity, while seals and bearings made of hard non-oxide or oxide ceramic materials can fail almost immediately. However, a drawback to the use of composite materials alone is that the composite material does not exhibit the same level of superior hardness, corrosion resistance, thermal conductivity, and strength that are enhanced physical properties of hard non-oxide or oxide ceramic materials.

Accordingly, there is a need to combine the superior physical properties of hard non-oxide or oxide ceramic materials with the enhanced tribological capability of composite versions of these hard non-oxide or oxide ceramic materials.

SUMMARY

Embodiments of the invention include a hybrid article comprising at least one hard non-oxide or oxide ceramic component of at least 95% of theoretical density directly bonded to, and different from, a hard non-oxide or oxide ceramic composite component comprising a tribology enhancing component.

In some embodiments, the at least one hard non-oxide or oxide ceramic component comprises a member of the group consisting of silicon carbide, pressureless sintered silicon carbide, liquid phase sintered silicon carbide, reaction bonded silicon carbide, tungsten carbide, aluminum oxide, and silicon nitride.

In some embodiments, the at least one hard non-oxide or oxide ceramic composite component comprises a member of the group consisting of silicon carbide, pressureless sintered silicon carbide, liquid phase sintered silicon carbide, reaction bonded silicon carbide, tungsten carbide, aluminum oxide, and silicon nitride. The tribology enhancing additive may be selected from the group consisting of but not limited to porosity, carbon graphite, graphite, and boron carbide.

In some embodiments, the hard non-oxide or oxide ceramic/hard non-oxide or oxide ceramic composite hybrid article comprises a hard non-oxide or oxide ceramic/hard non-oxide or oxide ceramic composite hybrid seal component comprising a wall having a thickness at least in part greater than 2.5 mm.

In some embodiments, the hybrid article is formed by preparing at least one hard non-oxide or oxide ceramic body of at least 95% of theoretical density, preparing at least one hard non-oxide or oxide ceramic composite body comprising a tribology enhancing component, placing the bodies into contact with one another to form a hybrid article, and treating the hybrid article to directly bond the bodies.

In some embodiments, treating the hybrid article comprises hot isostatic pressing. In other embodiments, treating the hybrid article comprises pressureless sintering. In yet other embodiments, treating the hybrid article comprises liquid phase sintering. In still other embodiments, treating the hybrid article comprises reaction bonding.

BRIEF DESCRIPTION OF THE DRAWINGS

The present invention will be more fully understood from the following detailed description considered in conjunction with the accompanying drawings, in which:

FIG. 1 is a front view of a hybrid article according to one embodiment of the present invention.

FIG. 2 is a cross-sectional view of the hybrid article of FIG. 1 taken along line 2-2.

DETAILED DESCRIPTION

Figure 3:
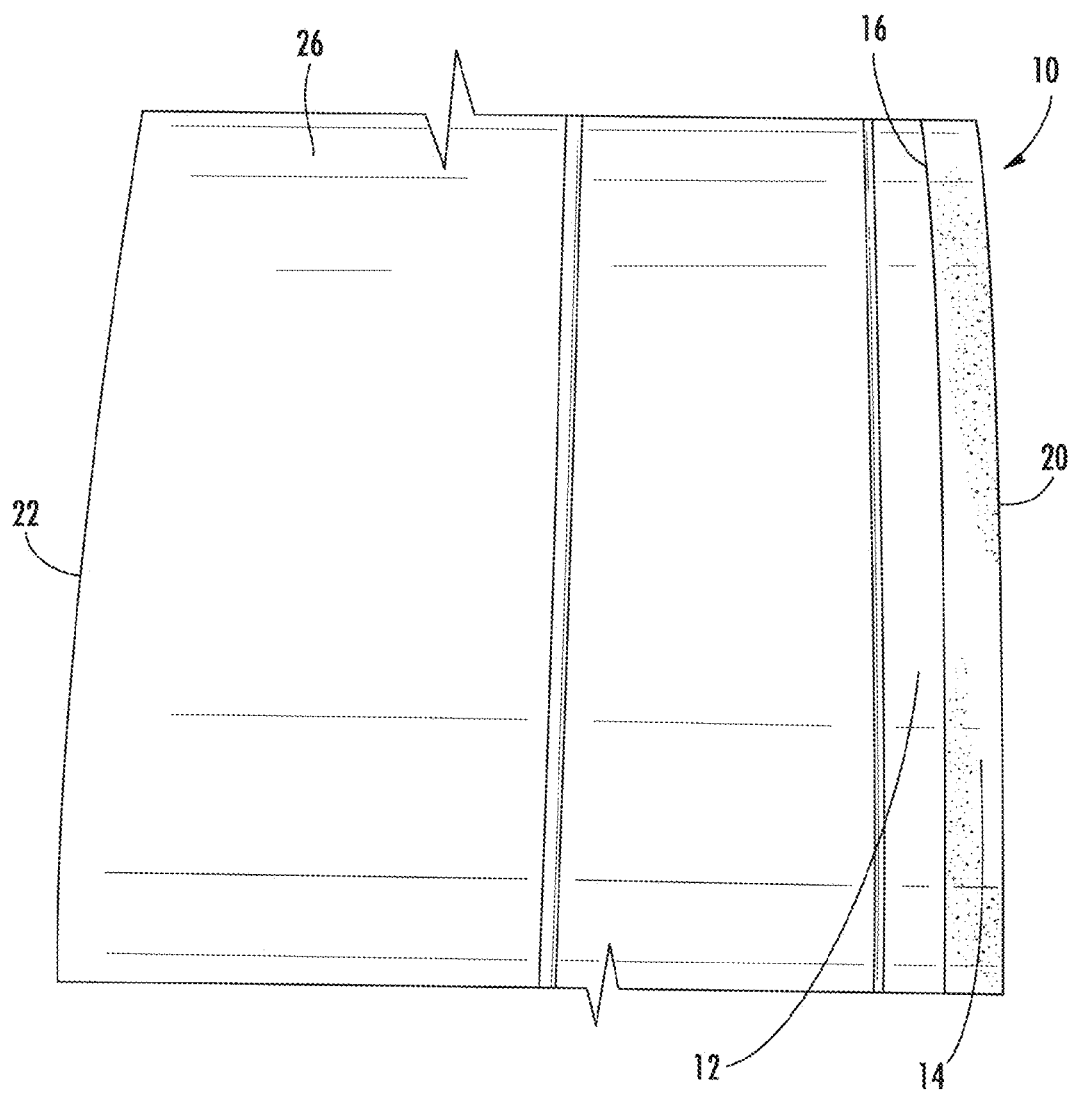
FIG. 3 is a side view of a portion of the surface of the hybrid article of FIG. 1.
Figure 4:
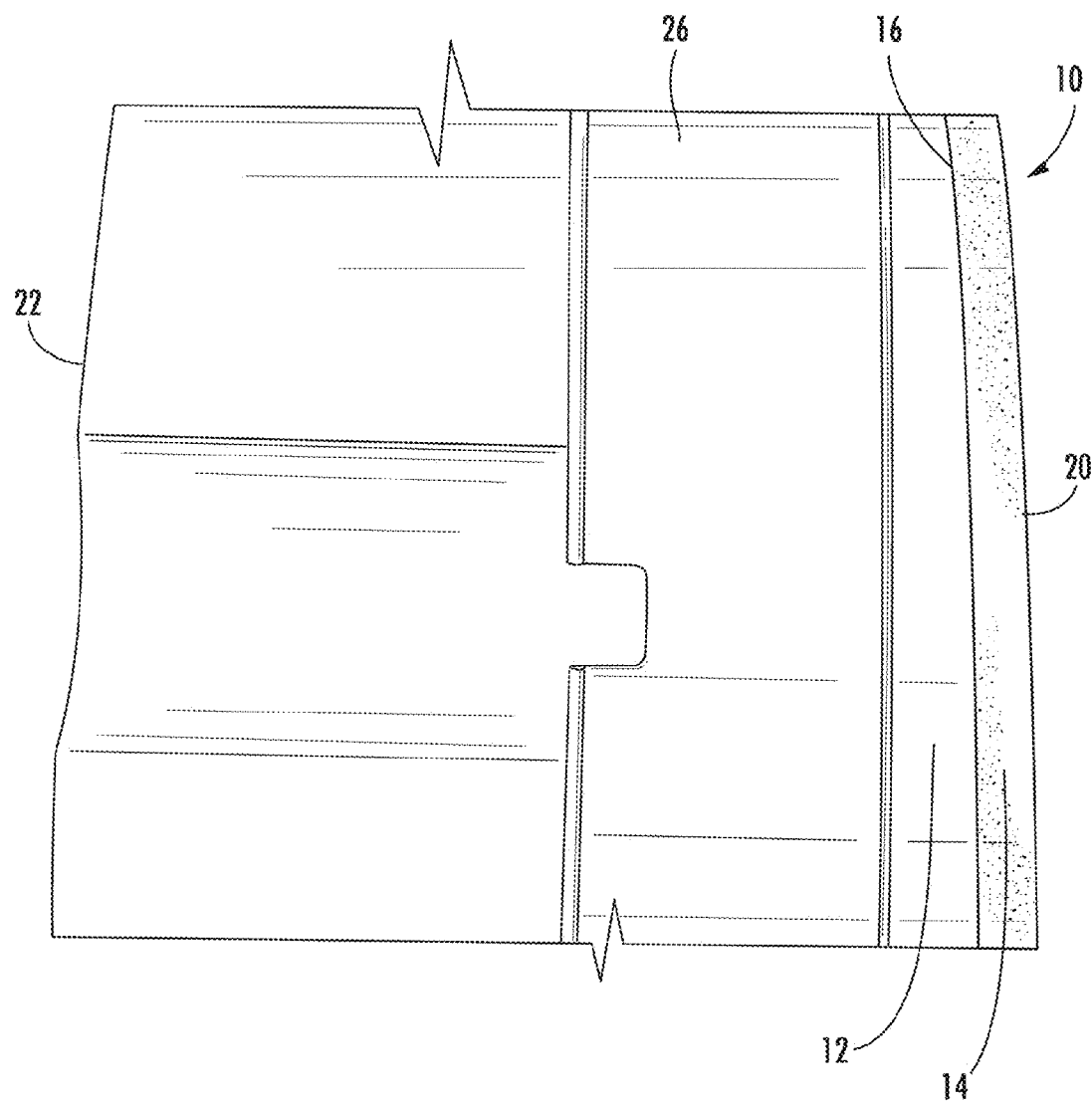
FIG. 4 is another side view of a portion of the surface of the hybrid article of FIG. 1.

Embodiments of the invention provide a hybrid article comprising at least one hard non-oxide or oxide ceramic component coupled to at least hard non-oxide or oxide ceramic composite component to create a hard non-oxide or oxide ceramic/hard non-oxide or oxide ceramic composite hybrid article.

FIGS. 1-12 illustrate embodiments of a hybrid article 10. The hybrid article 10 comprises at least one hard non-oxide or oxide ceramic component 12 and at least one hard non-oxide or oxide ceramic composite component 14. As shown in FIGS. 7-12, an interface 16 is formed between the components 12 and 14. The interface 16 demonstrates a clear transition from the at least one hard non-oxide or oxide ceramic component 12 to the at least one hard non-oxide or oxide ceramic composite component 14. In other embodiments, the hybrid article 10 comprises at least one hard non-oxide or oxide ceramic component 12 coupled to a plurality of hard non-oxide or oxide ceramic composite components 14. In yet other embodiments, the hybrid material comprises a plurality of hard non-oxide or oxide ceramic components 12 coupled to a plurality of hard non-oxide or oxide ceramic composite components 14.

In some embodiments, the combination of the components 12 and 14 in the hybrid article 10 is configured so that at least one hard non-oxide or oxide ceramic composite component 14 is positioned adjacent surfaces of the hybrid article 10 requiring enhanced tribological capability. The interface 16 comprises a robust bond between the at least hard non-oxide or oxide ceramic component 12 and the at least one hard non-oxide or oxide ceramic composite component 14. The resultant hybrid article 10 is a stiff and strong article with enhanced tribological capability, particularly suitable for seal components, axial bearing components, and radial bearing components, although the hybrid article 10 may be used in any suitable application.

Figure 5:
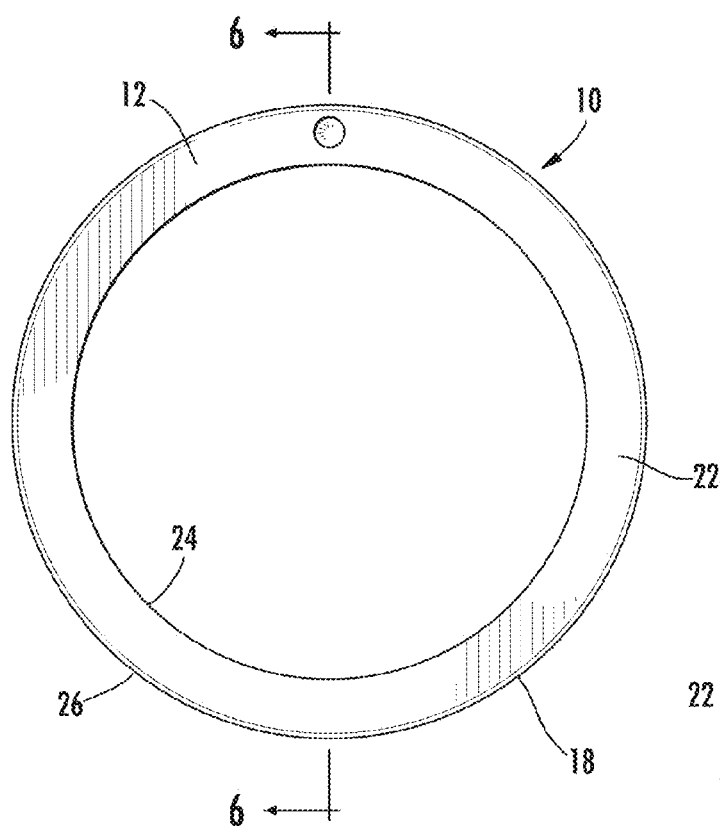
FIG. 5 is a front view of a hybrid article according to another embodiment of the present invention.
Figure 6:
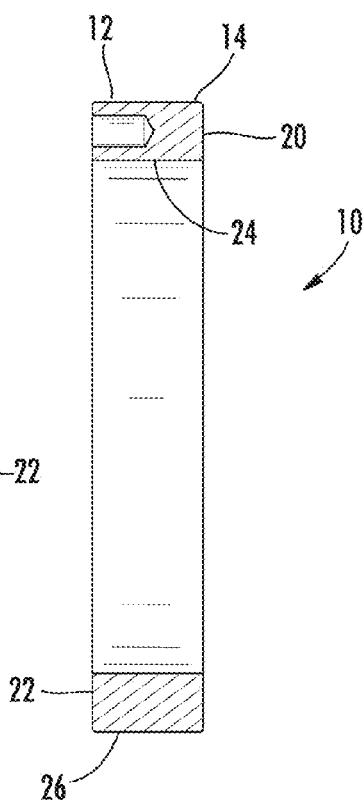
FIG. 6 is a cross-sectional view of the hybrid article of FIG. 5 taken along line 6-6.
Figure 7:
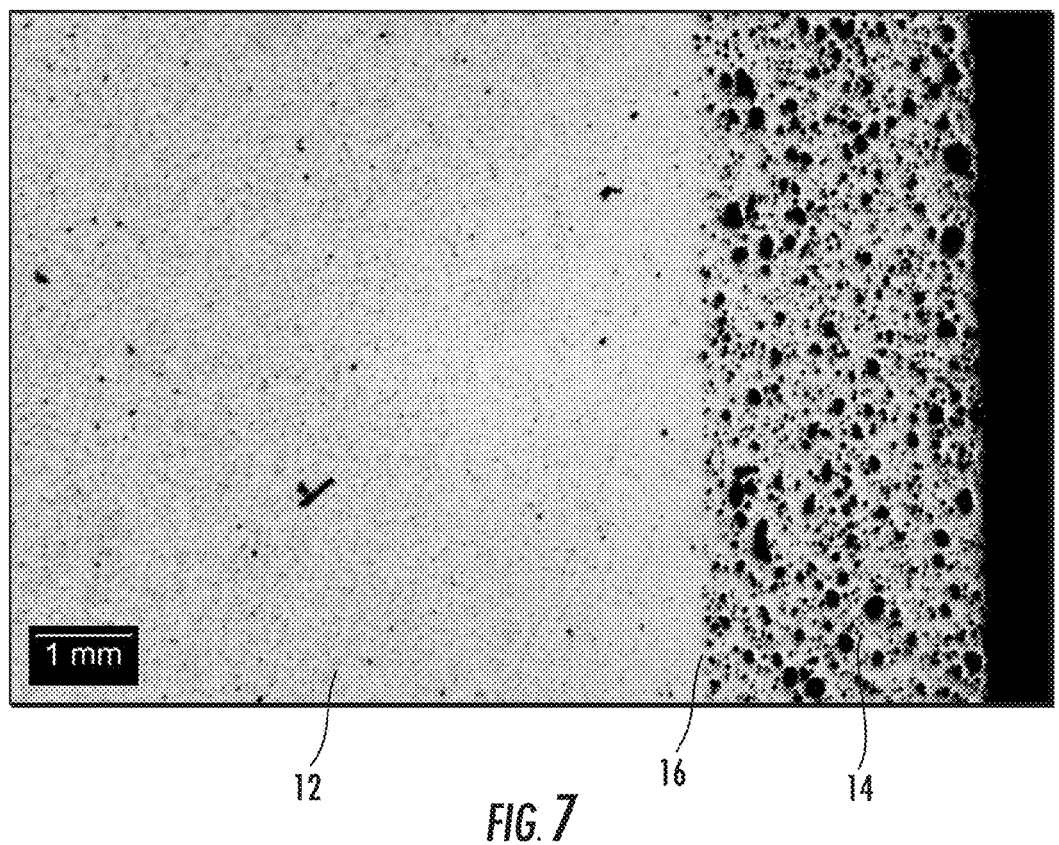
FIG. 7 is a photomicrograph of the cross-sectional view of the hybrid article of FIG. 1.
Figure 8:
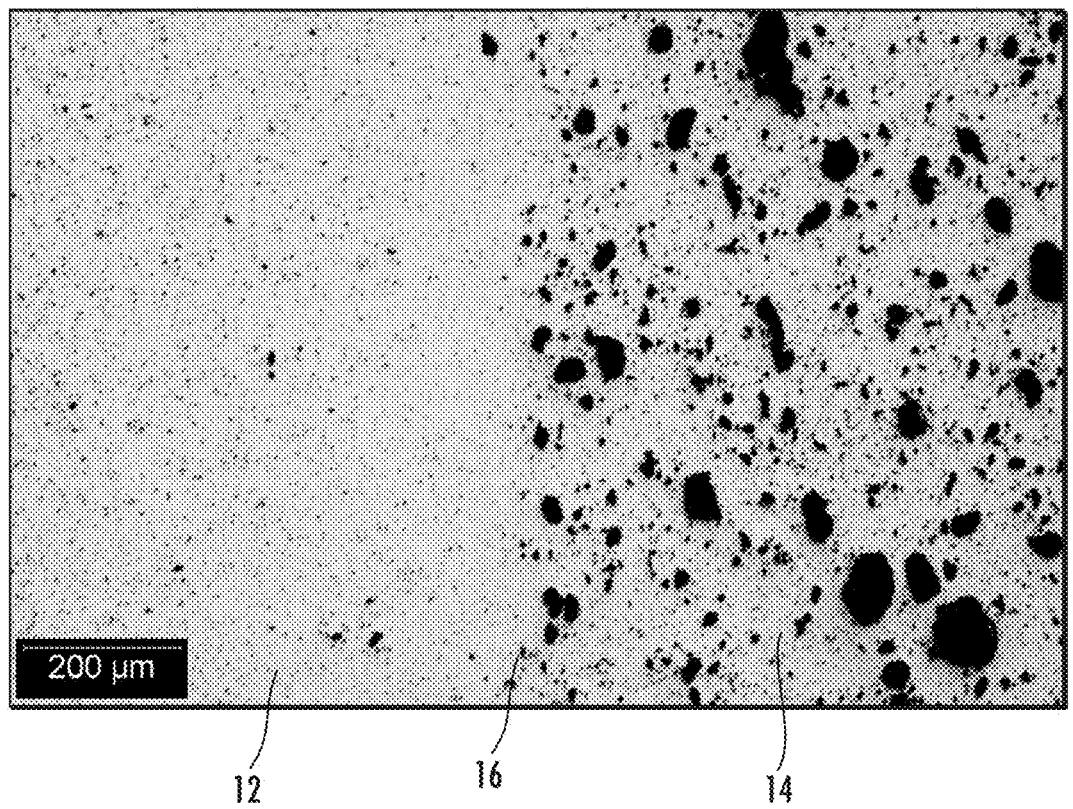
FIG. 8 is a photomicrograph of the cross-sectional view of the hybrid article of FIG. 1.
Figure 9:
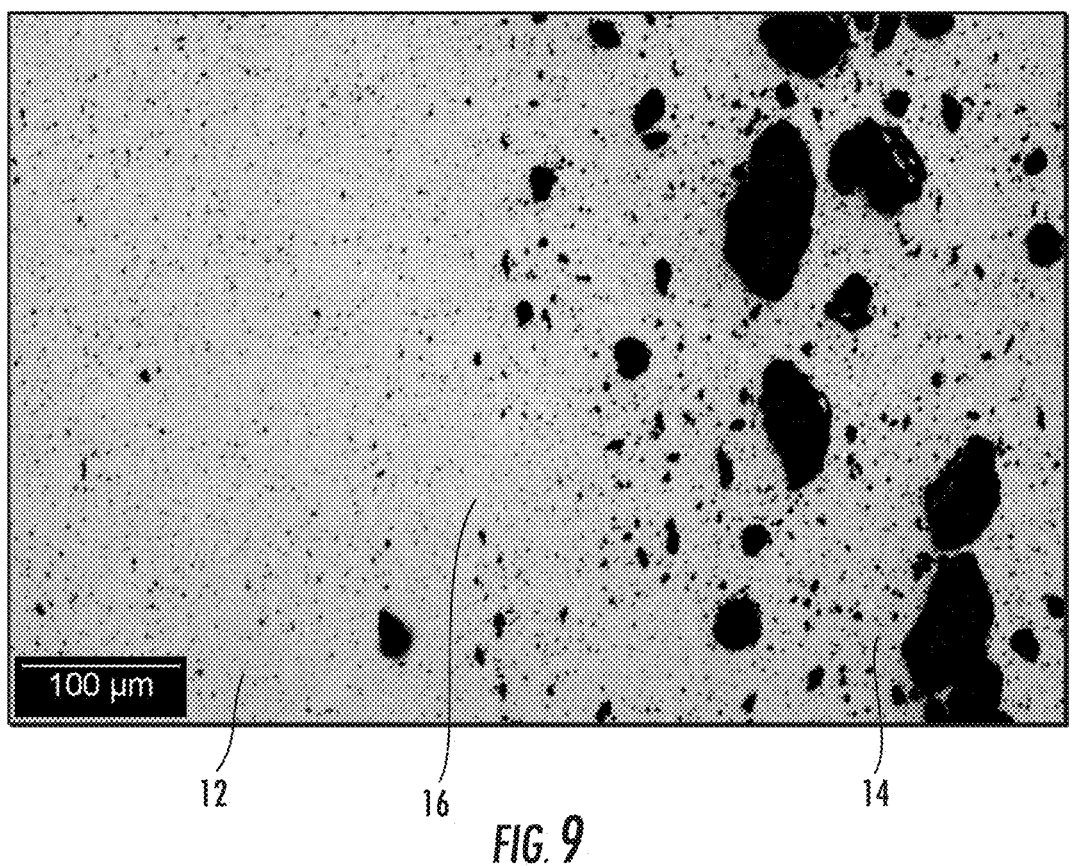
FIG. 9 is a photomicrograph of the cross-sectional view of the hybrid article of FIG. 1.
Figure 10:
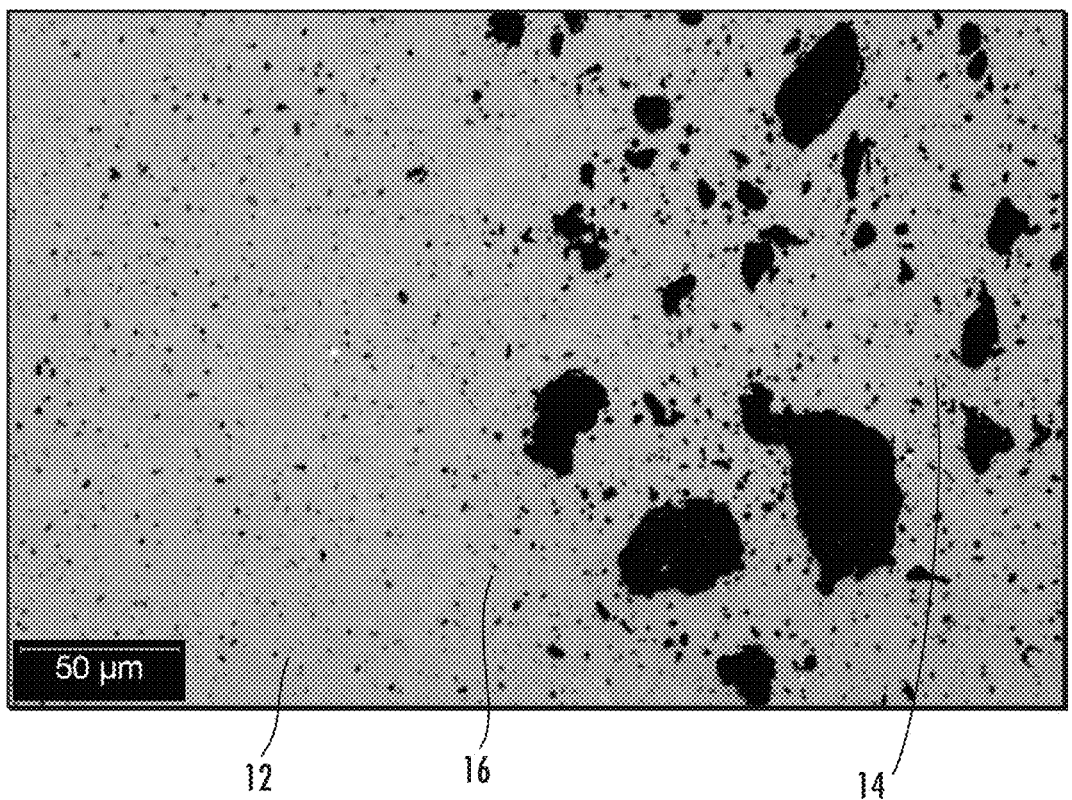
FIG. 10 is a photomicrograph of the cross-sectional view of the hybrid article of FIG. 1.
Figure 11:
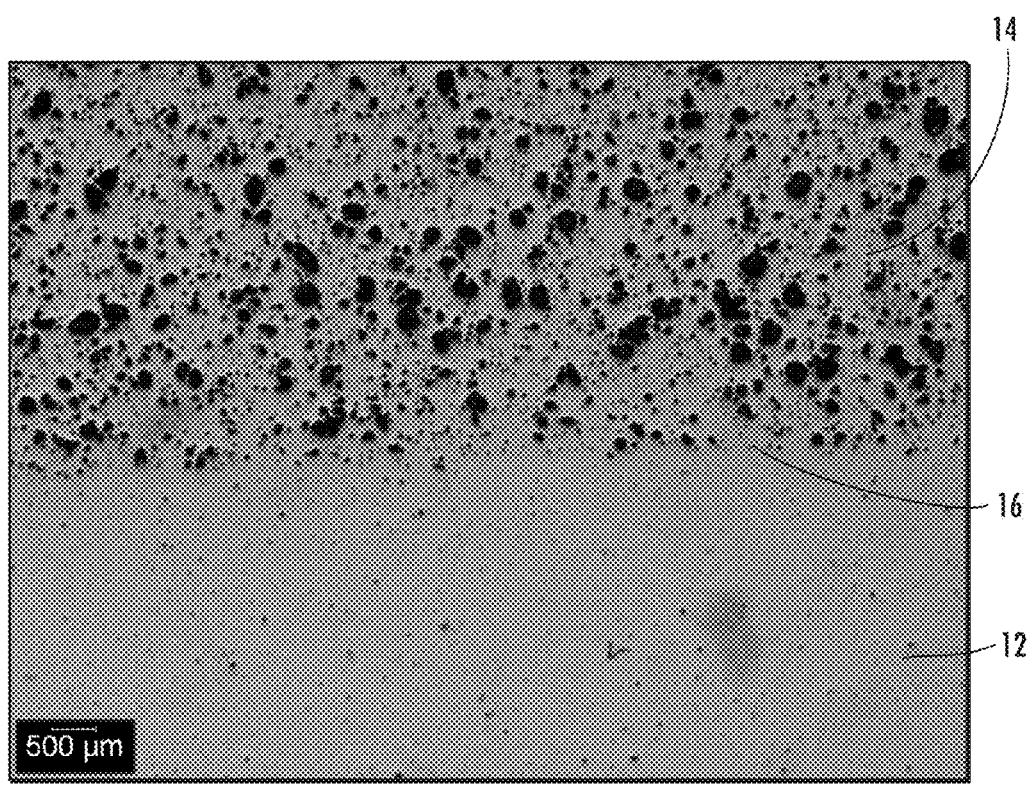
FIG. 11 is a photomicrograph of the cross-sectional view of the hybrid article of FIG. 1 taken from an alternate orientation.
Figure 12:
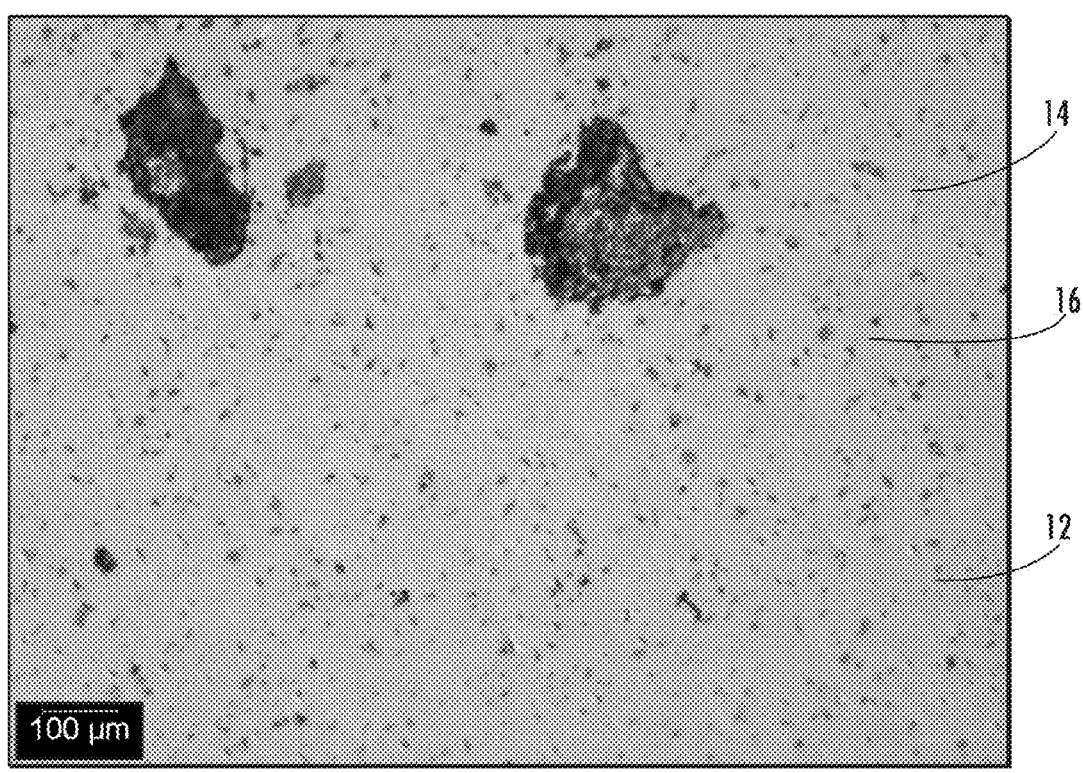
FIG. 12 is a photomicrograph of the cross-sectional view of the hybrid article of FIG. 1 taken from an alternate orientation.

For example, in some embodiments as shown in FIGS. 1 and 5, the hybrid article 10 may comprise a cylindrical shape 18, although one of ordinary skill in the relevant art will understand that the hybrid article may have any suitable shape including but not limited to rectilinear, spherical, frusto-conical, or other similar shapes. For example, the embodiment of the hybrid article 10 shown in FIGS. 1-4 comprises a plurality of inner diameters along its length so that an inner surface 24 includes a plurality of cross-sectional shapes. The embodiment of the hybrid article 10 shown in FIGS. 1-4 also comprises a plurality of outer diameters along its length so that an outer surface 26 includes a plurality of cross-sectional shapes. In contrast, an alternative embodiment of the hybrid article 10 shown in FIGS. 5 and 6 comprises a uniform inner diameter and a uniform outer diameter along its length so that the inner surface 24 and the outer surface 26 each have a uniform cross-sectional shape. However, one of ordinary skill in the relevant art will understand that any suitable shape for the hybrid article 10 may be used.

In the embodiments shown in FIGS. 1-6, the at least one hard non-oxide or oxide ceramic composite component 14 is located on a seal face 20 of the hybrid article 10. In this embodiment, the at least one hard non-oxide or oxide ceramic composite component 14 has a thickness at least in part greater than 2.5 mm. However, one of skill in the relevant art will understand that any appropriate thickness may be used. In other embodiments, the at least one hard non-oxide or oxide ceramic composite component 14 may be located on an opposing end 22 of the hybrid article 10, on both the seal face 20 and the opposing end 22, the inner surface 24, the outer surface 26, or any combination thereof.

In some embodiments, the at least one hard non-oxide or oxide ceramic component 12 comprises a substantially dense ceramic material. In some embodiments, the at least one hard non-oxide or oxide ceramic component 12 comprises a monolithic ceramic, where "monolithic ceramic" is intended to describe a ceramic that is uniformly formed of a single ceramic or a combination of ceramics that are combined in such a way that the individual components are indistinguishable. In some embodiments, the at least one hard non-oxide or oxide ceramic component 12 comprises tungsten carbide, aluminum oxide, or silicon nitride. In other embodiments, the at least one hard non-oxide or oxide ceramic component 12 comprises silicon carbide, pressureless sintered silicon carbide, liquid phase sintered silicon carbide, or reaction bonded silicon carbide. The density of the at least one hard non-oxide or oxide ceramic material may have any appropriate density, up to and including 100% of the theoretical density. In some embodiments, the density of the at least one hard non-oxide or oxide ceramic material is at least 95% of theoretical density.

With respect to the silicon carbide embodiments of the at least one hard non-oxide or oxide ceramic component 12, the silicon carbide material has a solid appearance with few visible pores. The silicon carbide material can be of the alpha form, the beta form, or a combination of these or other forms.

In some embodiments, the at least one hard non-oxide or oxide ceramic composite component 14 comprises tungsten carbide, aluminum oxide, or silicon nitride. In other embodiments, the at least one hard non-oxide or oxide ceramic composite component 14 comprises silicon carbide, pressureless sintered silicon carbide, liquid phase sintered silicon carbide, or reaction bonded silicon carbide. The hard non-oxide or oxide ceramic composite material has a microstructure of non-interconnected inclusions.

With respect to the silicon carbide embodiments of the at least one hard non-oxide or oxide ceramic composite component 14, the composite material comprises a densified self-sintered matrix of approximately 50 to 95% by weight silicon carbide, approximately 5.0 to 50% by weight of inclusions dispersed throughout the matrix, and small amounts, approximately 0.3 or less to 5.0% by weight, of any residual sintering aids, such as (but not limited to) aluminum, beryllium oxide, boron, boron carbide, and/or free carbon.

The hard non-oxide or oxide ceramic composite material typically has a density that is representative of the composite's composition as determined by the rule of mixtures. With respect to the silicon carbide embodiments of the at least one hard non-oxide or oxide ceramic composite component 14, the composite silicon carbide can be of the alpha form, the beta form, or a combination of these or other forms.

With respect to the silicon carbide embodiments of the at least one hard non-oxide or oxide ceramic composite component 14, the inclusions are distributed throughout the silicon carbide of the composite material. In one embodiment, the average grain size of the carbon graphite inclusions is greater than the average grain size of the silicon carbide. For example, in this embodiment, the silicon carbide has an average grain size between approximately 10 and 25 μm, and the carbon graphite inclusions have an average grain size between approximately 75 and 125 μm.

A. Preparation of the Hard Non-Oxide or Oxide Ceramic Component

The hard non-oxide or oxide ceramic component materials include but are not limited to silicon carbide, pressureless sintered silicon carbide, liquid phase sintered silicon carbide, reaction bonded silicon carbide, tungsten carbide, aluminum oxide, and silicon nitride. As will be understood by one of skill in the relevant art, the tungsten carbide, aluminum oxide, and silicon nitride embodiments of the at least one hard non-oxide or oxide ceramic component 12 are manufactured in a known manner.

Likewise, the silicon carbide, pressureless sintered silicon carbide, liquid phase sintered silicon carbide, and reaction bonded silicon carbide embodiments of the at least one hard non-oxide or oxide ceramic component 12 are also manufactured in a known manner. The at least one hard non-oxide or oxide ceramic component 12 may be produced from a raw batch including the hard non-oxide or oxide ceramic material. For example, the silicon carbide embodiments of the at least one hard non-oxide or oxide ceramic component 12 may be produced from a raw batch of silicon carbide, which includes fine (sub-micron) and pure silicon carbide powder. Preferably, α-silicon carbide is used. However, any combination of the forms of silicon carbide may be used.

In the silicon carbide, pressureless sintered silicon carbide, and liquid phase sintered silicon carbide embodiments, sintering aids, such as non-oxide sintering aids, aluminum; mineral oxides including but not limited to beryllium oxide, aluminum oxide, magnesium oxide, yttrium oxide; a boron source; and/or a carbon source are added to the raw batch and mixed thoroughly to ensure complete dispersion. Boron sources include elemental boron and boron carbide ($B_4C$), and carbon sources include elemental carbon or a carbonizable organic material, such as phenolic resin, petroleum pitch, coal tar pitch, furfuryl alcohol or sugar.

B. Preparation of the Hard Non-oxide or Oxide Ceramic Composite Component

The hard non-oxide or oxide ceramic composite component materials include but are not limited to silicon carbide, pressureless sintered silicon carbide, liquid phase sintered silicon carbide, reaction bonded silicon carbide, tungsten carbide, aluminum oxide, and silicon nitride. As will be understood by one of skill in the relevant art, the tungsten carbide, aluminum oxide, and silicon nitride embodiments of the at least one hard non-oxide or oxide ceramic composite component 14 are manufactured in a known manner.

Likewise, the silicon carbide, pressureless sintered silicon carbide, liquid phase sintered silicon carbide, and reaction bonded silicon carbide embodiments of the at least one hard non-oxide or oxide ceramic composite component 14 are also manufactured in a known manner.

The at least one hard non-oxide or oxide ceramic composite component 14 may be produced from a raw batch including the hard non-oxide or oxide ceramic material and inclusion particles. In the silicon carbide embodiments of the at least one hard non-oxide or oxide ceramic composite components 14, the composite material may be produced from a raw batch of silicon carbide. The raw batch is produced from fine-grained, high purity silicon carbide powder. Preferably, at least 0.5% α-silicon carbide relative to β-silicon carbide is used. However, any combination of the forms of silicon carbide may be used. Typically, approximately 50 to 90% by weight (of the total raw batch) of silicon carbide is dispersed in an inert solvent, such as water, to form a slurry which aids complete mixing of the raw batch ingredients during preparation. Other mixing aids, such as a dispersant (for example ammonium polymethacrylate) or a suspension agent, such as xanthan gum, may also be added.

A temporary filler may also be added to the raw batch slurry and thoroughly mixed for good dispersion to provide green strength. Typically, approximately 0.75 to 15.0% (of the total raw batch) of the temporary filler is added to the slurry. The temporary filler can be any particulate material which will decompose and volatilize out of the mixture at or below the carbonization temperature of the mixture to create a microstructure of non-interconnected inclusions. Typically, the temporary filler comprises particles of an organic material, such as ground nutshells, wax particles, or polypropylene beads. In certain circumstances, for example when the temporary filler is volatilized in a vacuum at very high temperatures (at or above the melting point of the filler), an inorganic material such as ceramic beads might also be used. Preferably, the temporary filler has an average grain size between approximately 10 and 45 μm.

Inclusions are also added to the slurry and thoroughly mixed for good dispersion. Inclusions suitable for use in the present invention may include any additive capable of improving the tribological capability of the at least one hard non-oxide or oxide ceramic composite component 14. For example, inclusions may be, but are not limited to, porosity, graphite, carbon graphite, boron carbide, and other tribology enhancing additives.

In one embodiment, coated graphite particles are added to the slurry. The coated graphite particles are coarse graphite particles coated with a carbon precursor, such as phenolic resin, or another resin or material which will decompose upon heating to leave a carbon residue. Such other materials include furfuryl alcohol, polyester, petroleum pitch, coal tar pitch, or mixtures of these and other materials. Typically, the coating is dissolved in a suitable solvent and mixed thoroughly with the graphite to bond the graphite particles. The mixture is then dried to evaporate the solvent and crushed to obtain the coated graphite particles of a desired size. Typically, the coated graphite particles are passed through a 65 mesh sieve to obtain particles of less than 212 μm. The coated graphite particles are then added to the slurry. Typically, approximately at least 5.0 to 50%, and preferably approximately 10 to 20%, by weight (of the total raw batch) of the coated graphite particles are added to the slurry. But any amount of such particles is helpful in improving the self-lubricating properties of the final composite material.

Process aids, including temporary binders and lubricants, for example oleic acid or any other fatty acid, can be added to the slurry to facilitate the molding or shaping of the raw batch into a green body or to facilitate other processing steps. The addition of a suspension or viscosity agent is particularly helpful if the inclusion particles are large. For example, if xanthan gum is added to the slurry and mixed, it causes the slurry to coagulate, which holds the inclusion particles in suspension, allowing uniform dispersion. Some materials added to the raw batch can perform multiple functions. For example, phenolic resin can function in the raw batch as both a carbon source sintering aid and a temporary binder. Polyethylene glycol can function as both a temporary binder and a die lubricant.

The inert solvent, temporary filler, temporary binder, dispersant, lubricant, and suspension agent are all temporary additives, which do not form a part of the final hard non-oxide or oxide ceramic composite material.

In the silicon carbide, pressureless sintered silicon carbide, and liquid phase sintered silicon carbide embodiments, sintering aids, such as aluminum; mineral oxides including but not limited to beryllium oxide, aluminum oxide, magnesium oxide, yttrium oxide; a boron source; and/or a carbon source are added to the slurry and mixed thoroughly to ensure complete dispersion. Boron sources include elemental boron and boron carbide ($B_4C$), and carbon sources include elemental carbon or a carbonizable organic material, such as phenolic resin, petroleum pitch, coal tar pitch, furfuryl alcohol or sugar. Typically, approximately 2.0 to 20% by weight (of the total raw batch) of the sintering aids are added to the slurry.

The resulting slurry is mixed thoroughly to ensure sufficient dispersion and dried. Typically, the slurry is spray dried to form spherical agglomerates. Other suitable methods for obtaining such granules, such as pan drying followed by crushing and sieving, may be employed.

C. Preparation of the Hybrid Article

The at least one hard non-oxide or oxide ceramic component 12 and the at least one hard non-oxide or oxide ceramic composite component 14 are assembled during the same forming process to create the hybrid article 10 having the interface 16 between the components. In some embodiments, the at least one hard non-oxide or oxide ceramic component 12 and the at least one hard non-oxide or oxide ceramic composite component 14 include the same hard non-oxide or oxide ceramic material. In other embodiments, the at least one hard non-oxide or oxide ceramic component 12 and the at least one hard non-oxide or oxide ceramic composite component 14 may include different hard non-oxide or oxide ceramic materials.

In one embodiment, the at least one hard non-oxide or oxide ceramic component 12 is assembled with the at least one hard non-oxide or oxide ceramic composite component 14. In other embodiments, the at least one hard non-oxide or oxide ceramic component 12 is assembled with a plurality of hard non-oxide or oxide ceramic composite components 14. In yet other embodiments, a plurality of hard non-oxide or oxide ceramic components 12 are assembled with a plurality of hard non-oxide or oxide ceramic composite components 14.

The assembly of the components 12 and 14 in the hybrid article 10 is configured so that the at least one hard non-oxide or oxide ceramic composite component 14 is positioned adjacent surfaces of the hybrid article 10 requiring enhanced tribological capability. Conventional methods of molding and shaping can be employed, such as isostatic or die pressing, of the hybrid article to form a green body. Preferably, the hybrid article is pressed at pressures ranging between approximately 3 and 9 tons/in2.

The hybrid article 10 is then exposed to the appropriate environment, such as heat, to cure any temporary binders included in the composite component. The molding and shaping of the hybrid article 10 can also include machining to a desired pre-finished shape and designed in such a manner so that the at least one hard non-oxide or oxide ceramic composite component 14 is positioned adjacent surfaces of the hybrid article 10 requiring enhanced tribological capability.

The shaped green body is then carbonized in a non-oxidizing atmosphere at a temperature typically above approximately 800° F. The carbonization step carbonizes any carbonizable carbon source used as a sintering aid and decomposes and volatilizes the temporary filler, which leaves a microstructure of non-interconnected inclusions. The carbonization step also carbonizes the resin of the resin-coated graphite particles and volatilizes any residue of any dispersant, lubricant, or suspension agent included in the composite component.

In a typical carbonization cycle, the green body is heated in an oven from room temperature to 350° F. during a half hour and allowed to soak at that temperature for another half hour. The temperature is then raised to 850° F. over a period of 10 hours and held at 850° F. for five hours to carbonize the body. The hybrid article 10 is then cooled to room temperature. Other carbonization cycles may be used.

With respect to the silicon carbide, pressureless sintered silicon carbide, and liquid phase sintered silicon carbide embodiments, as well as some embodiments of tungsten carbide, aluminum oxide, and silicon nitride, the hybrid article 10 is then sintered via hot isostatic pressing, pressureless sintering, or liquid phase sintering, creating a seamless connection between the two components. In a typical pressureless sintering cycle, the temperature is raised to the sintering temperature over an eight hour period, the furnace is held at the peak temperature for one hour, and then allowed to cool to room temperature. The actual times depend upon the particular furnace used. Other suitable sintering cycles may also be employed.

In the specific example of liquid phase sintering, transient liquid phase sintering occurs when the liquid phase is absorbed by the solid phase during sintering. Because the amount of liquid that forms and the time for which it exists are dependent on the sintering conditions, transient liquid phase sintering is process sensitive. The liquid phase can form directly by melting of eutectic phase mixtures that form by diffusion or by incipient melting. The liquid flows between the powder particles, filling pores and causing densification by capillary action and through the provision of a fast diffusion pathway. Shrinkage occurs by particle rearrangement if the liquid volume is high enough and the green density is low enough, by the particles changing shape to allow better packing, by pore filling and by solid state sintering if a solid skeleton forms.

In the reaction bonded silicon carbide embodiments, the hybrid article 10 is infiltrated with liquid silicon. The silicon reacts with the carbon to form silicon carbide. The reaction product bonds the silicon carbide particles, and any excess silicon fills any remaining pores.

Finally, if necessary, the hybrid article 10 can be finished by grinding, diamond polishing, or any other finishing method. The article is designed in such a manner as to ensure the composite material is located on those surfaces requiring enhanced tribological capability.

The foregoing is provided for purposes of illustrating, explaining, and describing embodiments of the present invention. Modifications and adaptations to these embodiments will be apparent to those skilled in the art and may be made without departing from the scope or spirit of the invention.

What is claimed is:

1. A hard non-oxide ceramic/hard non-oxide ceramic composite hybrid article comprising:
   (a) at least one silicon carbide ceramic component of at least 95% of theoretical density;
   directly bonded to, and different from (b) at least one component formed of a ceramic composite material comprising 50-95% by weight silicon carbide, and further comprising 5-50% by weight a tribology enhancing component selected from carbon and carbon graphite.

2. The hard non-oxide ceramic/hard non-oxide or oxide ceramic composite hybrid article according to claim 1, wherein the hard non-oxide ceramic/hard non-oxide or oxide ceramic composite hybrid article comprises a hard non-oxide or oxide ceramic/hard non-oxide or oxide ceramic composite hybrid seal component comprising a wall having a thickness at least in part greater than 2.5 mm.

3. The hard non-oxide ceramic/hard non-oxide ceramic composite hybrid article according to claim 1, wherein the at least one hard non-oxide ceramic composite component comprises pressureless sintered silicon carbide.

4. The hard non-oxide ceramic/hard non-oxide ceramic composite hybrid article according to claim 1, wherein the at least one hard non-oxide ceramic composite component comprises liquid phase sintered silicon carbide.

5. The hard non-oxide ceramic/hard non-oxide ceramic composite hybrid article according to claim 1, wherein the at least one hard non-oxide ceramic composite component comprises reaction bonded silicon carbide.

6. The hard non-oxide ceramic/hard non-oxide ceramic composite hybrid article according to claim 1, wherein the tribology enhancing component further comprises a component selected from the group consisting of porosity and boron carbide.

7. The hard non-oxide ceramic/hard non-oxide ceramic composite hybrid article according to claim 1, wherein the at least one hard non-oxide ceramic component comprises pressureless sintered silicon carbide.

8. The hard non-oxide ceramic/hard non-oxide ceramic composite hybrid article according to claim 1, wherein the at least one hard non-oxide ceramic component comprises liquid phase sintered silicon carbide.

9. The hard non-oxide ceramic/hard non-oxide ceramic composite hybrid article according to claim 1, wherein the at least one hard non-oxide ceramic component comprises reaction bonded silicon carbide.

10. A hard non-oxide ceramic/hard non-oxide ceramic composite hybrid seal component comprising:
(a) at least one part formed of a silicon carbide ceramic of at least 95% of theoretical density;
directly bonded to each of, and different from
(b) at least two parts formed of a silicon carbide ceramic composite comprising 50-95% by weight silicon carbide, and further comprising 5-50% by weight a tribology enhancing component selected from carbon graphite or graphite;
wherein the hard non-oxide ceramic/hard non-oxide ceramic composite hybrid seal component comprises a wall having a thickness at least in part greater than 2.5 mm.

* * * * *